(12) United States Patent
Hadzialic et al.

(10) Patent No.: US 8,155,492 B2
(45) Date of Patent: Apr. 10, 2012

(54) PHOTONIC CRYSTAL AND METHOD OF FABRICATION

(75) Inventors: Sanja Hadzialic, Oslo (NO); Olav Solgaard, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 833 days.

(21) Appl. No.: 12/249,550

(22) Filed: Oct. 10, 2008

(65) Prior Publication Data

US 2009/0097811 A1    Apr. 16, 2009

Related U.S. Application Data

(60) Provisional application No. 60/978,941, filed on Oct. 10, 2007.

(51) Int. Cl.
*G02B 6/10* (2006.01)
(52) U.S. Cl. ........................................ 385/129
(58) Field of Classification Search .................... 385/129
See application file for complete search history.

(56) References Cited

U.S. PATENT DOCUMENTS

| | | | | |
|---|---|---|---|---|
| 5,987,208 | A * | 11/1999 | Gruning et al. | 385/146 |
| 2003/0095755 | A1 * | 5/2003 | Vaganov et al. | 385/88 |
| 2006/0147169 | A1 * | 7/2006 | Sugita et al. | 385/129 |

FOREIGN PATENT DOCUMENTS

WO    WO 2005/078489 A1 *    8/2005

OTHER PUBLICATIONS

Mallick et al., "Double-Layered Monolithic Silicon Photonic Crystals", "Conference on Lasers and Electro-Optics 2008", May 4, 2008, Publisher: Optical Society of America, Published in: US.
Mizushima et al., "Empty-space-in-silicon technique for fabricating a silicon-on-nothing structure", "Applied Physics Letters", Nov. 13, 2000, pp. 3290-3292, vol. 77, No. 20, Publisher: American Institute of Physics, Published in: US.
Sato et al., "Fabrication of Silicon-on-Nothing Structure by Substrate Engineering Using the Empty-Space-in-Silicon Formation Techiqu", "Japanese Journal of Applied Physics", 2004, pp. 12-18, vol. 43, No. 1, Publisher: The Japan Society of Applied Physics, Published in: JP.
Jung et al., "Large-Area High-Reflectivity Broadband Monolithic Silicon Photonic Crystal Mirror MEMS Scanner", "2008 IEEE/LEOS International Conference on Optical MEMS and Nanophotonics", Aug. 26, 2008, Publisher: IEEE, Published in: US.

(Continued)

*Primary Examiner* — Uyen Chau N Le
*Assistant Examiner* — Kajli Prince
(74) *Attorney, Agent, or Firm* — DeMont & Breyer, LLC

(57)    ABSTRACT

A method is disclosed for forming a photonic crystal in a homogeneous layer of material. The method enables the fabrication of 1D, 2D, or 3D photonic crystals. Photonic crystals in accordance with embodiments of the present invention exhibit low temperature sensitivity and low device curvature. In some embodiments, photonic crystals in accordance with embodiments of the present invention are integrated with mechanical elements, such as micromechanical, nanomechanical, microelectronic, and microfluidics devices and systems.

31 Claims, 10 Drawing Sheets

OTHER PUBLICATIONS

Jung et al., "Large-Area Monolithic Photonic Crystal Mirrors with High Reflectivity in the 1250-1650nm Band Patterned by Optical Litho", "2008 IEEE/LEOS International Conference on Optical MEMS and Nanophotonics", , Publisher: IEEE, Published in: US.

Sato et al., "Micro-structure Transformation of Silicon: A Newly Developed Transformation Technology for Patterning Silicon Surfaces u", "Japanese Journal of Applied Physics", Sep. 2000, pp. 5033-5038, vol. 39, No. 9A, Publisher: The Japan Society of Applied Physics, Published in: JP.

Hadzialic et al., "Monolithic Photonic Crystals", "20th Annual Meeting of the IEEE Lasers and Electro-Optics Society 2007", Oct. 21-25, 2007, pp. 341-342, Publisher: IEEE, Published in: US.

* cited by examiner

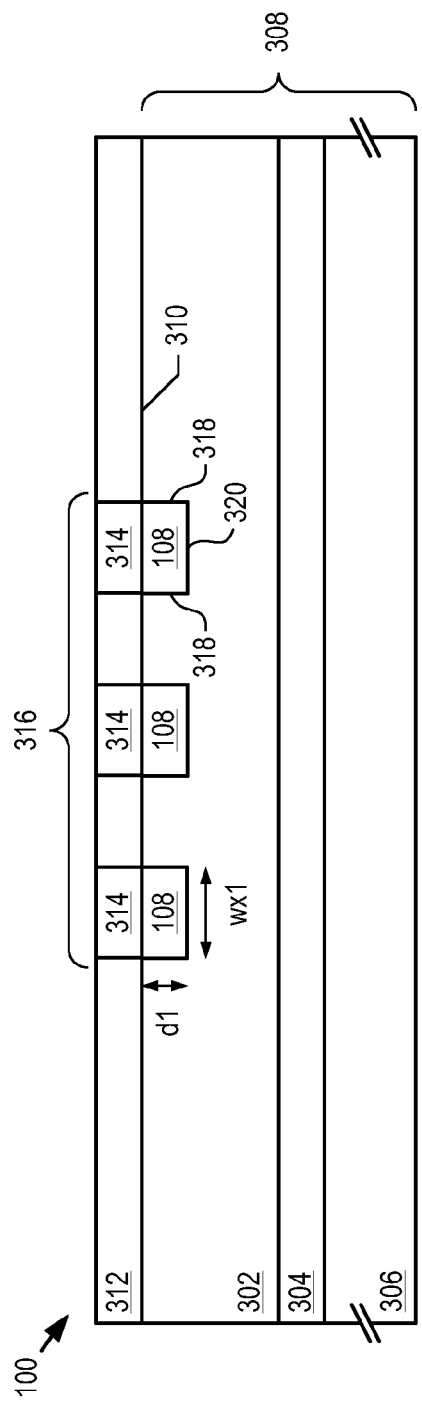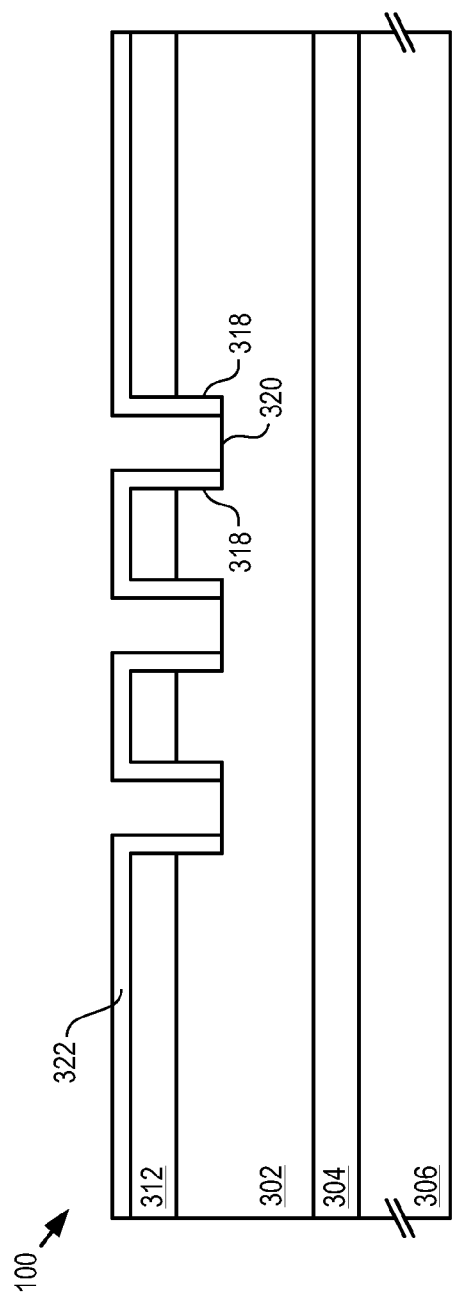

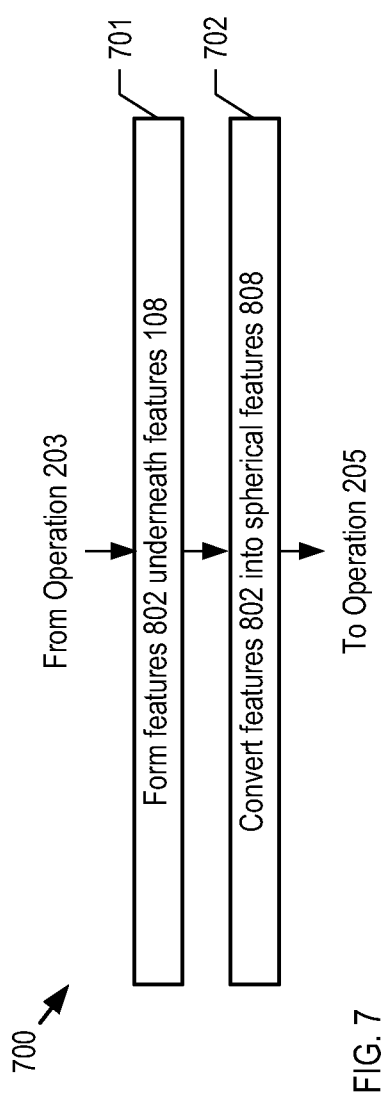
FIG. 7
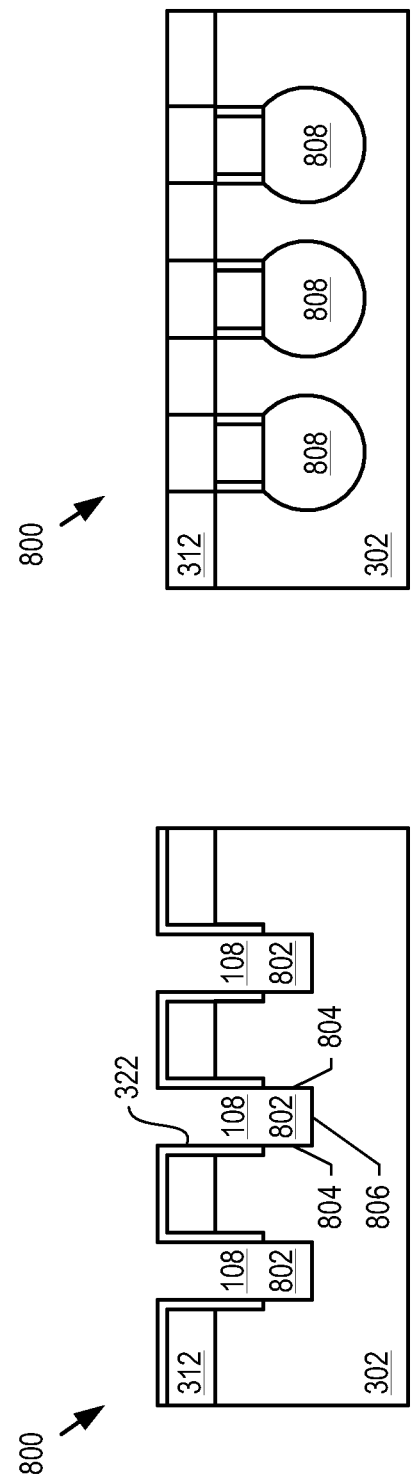
FIG. 8A
FIG. 8B

PHOTONIC CRYSTAL AND METHOD OF FABRICATION

STATEMENT OF RELATED CASES

This application claims priority of provisional patent application U.S. Ser. No. 60/978,941, filed 10 Oct. 2007, the entire contents of which are herein incorporated by reference.

FIELD OF THE INVENTION

The present invention relates to photonic band gap devices in general, and, more particularly, to photonic crystals.

BACKGROUND OF THE INVENTION

A photonic crystal is a periodic lattice of medium that prohibits light waves of certain wavelengths from propagating in certain directions. The prohibited range of wavelengths (in certain directions) is referred to as a photonic band gap, and is a defining characteristic for the photonic crystal. A photonic band gap is analogous to an electronic band gap found in semiconductors wherein electrons are forbidden at certain energy levels. The photonic band gap is determined by the refractive index of the medium, the size of the features that compose the periodic lattice, and the periodicity of these features.

Another defining characteristic of a photonic crystal is the presence of certain allowed electromagnetic states (i.e., optical modes) in the photonic crystal. In other words, light waves of certain wavelengths are allowed to propagate in certain directions. These allowed electromagnetic states are commonly referred to as the "guided resonances" of the photonic crystal.

A photonic crystal can be formed as one-dimensional (1D), two-dimensional (2D), or three-dimensional (3D) structures. One-dimensional photonic crystal exhibit periodicity in only one dimension. For example, a dielectric mirror that comprises interleaving layers of thin-films is a 1D photonic crystal. A 2D photonic crystal exhibits periodicity in two dimensions, and therefore suppresses or guides light within a plane of material. Examples of 2D photonic crystals include integrated waveguides and planar mirrors. In similar fashion, 3D photonic crystals exhibit periodicity in three dimensions and can suppress or guide light within a volume.

Although 1D photonic crystals are widely used in many applications, 2D and 3D photonic crystals have not met with the same success as yet. One reason for the lack of success for 2D and 3D photonic crystals is the difficulty of their fabrication. Since the wavelength of light on which they operate is typically on the order of 1 micron, the size of the features that compose these structures is typically on the tens to hundreds of nanometer scale. In addition, 2D and 3D photonic crystals typically employ multiple layers of disparate materials. As a result, fabrication is complicated and the use of disparate materials leads to internal stress and thermal expansion coefficient (TEC) mismatch. Internal stress and TEC mismatch leads to device curvature and temperature sensitivity.

SUMMARY OF THE INVENTION

The present invention provides a photonic crystal formed in a homogeneous layer of material. For example, the present invention provides photonic crystals formed in a single layer of single-crystal silicon, such as a conventional silicon substrate. In addition, the present invention provides photonics crystals that are one-dimensional, two-dimensional, or three-dimensional. Embodiments of the present invention are particularly well-suited for use as mirrors, wavelength filters, tunable optical elements, integrated waveguides, and sensors. In addition embodiments of the present invention are integrated with mechanical components, such as micromechanical actuators or sensors, nanomechanical components, microfluidics systems, optical fibers, and microelectronic components.

The present invention comprises methods for fabricating photonic crystals. In some embodiments, a photonic crystal is formed by etching a first plurality of features into a surface of a substrate. This first plurality of features is then protected to enable it to act as a mask for a second etch that forms a second plurality of features in the substrate. This second plurality of features is self-aligned to and undercuts the first plurality of features. By virtue of the presence of the undercut below the first plurality of features, a vertical refractive index variation is introduced in the homogeneous substrate material. The refractive index of the substrate material, and the size and periodicity of the first plurality of features are selected to define the set of guided resonances of the photonic crystal. These guided resonances are defining characteristics of the photonic crystal.

An embodiment of the present invention comprises a method for forming a photonic crystal comprising: forming a first plurality of features in a substrate characterized by a refractive index, wherein the first plurality of features defines a pattern comprising a first periodicity in a first dimension, and wherein each of the first plurality of features comprises a first width that is substantially aligned to the first dimension; forming a second plurality of features in the substrate, wherein the second plurality of features are formed by operations comprising; (1) protecting each of the first plurality of features to form a first mask for a first etch; and (2) etching the substrate in the first etch; and selecting the refractive index, the first periodicity, and the first width to define a first photonic band gap and/or modes for light having a first wavelength.

BRIEF DESCRIPTION OF THE DRAWINGS

FIGS. 3A-3G depict sequential cross-sectional views of scanning mirror 100 during fabrication in accordance with the method depicted in FIG. 2.

FIG. 7 depicts a method for fabricating a photonic crystal in accordance with an alternative embodiment of the present invention.

FIGS. 8A-B depict sequential cross-sections of photonic crystal 800 during fabrication in accordance with the alternative embodiment of the present invention.

DETAILED DESCRIPTION

The following term is defined for use in this Specification, including the appended claims:

Set of guided resonances means the electromagnetic modes of a photonic crystal.

Figure 1:
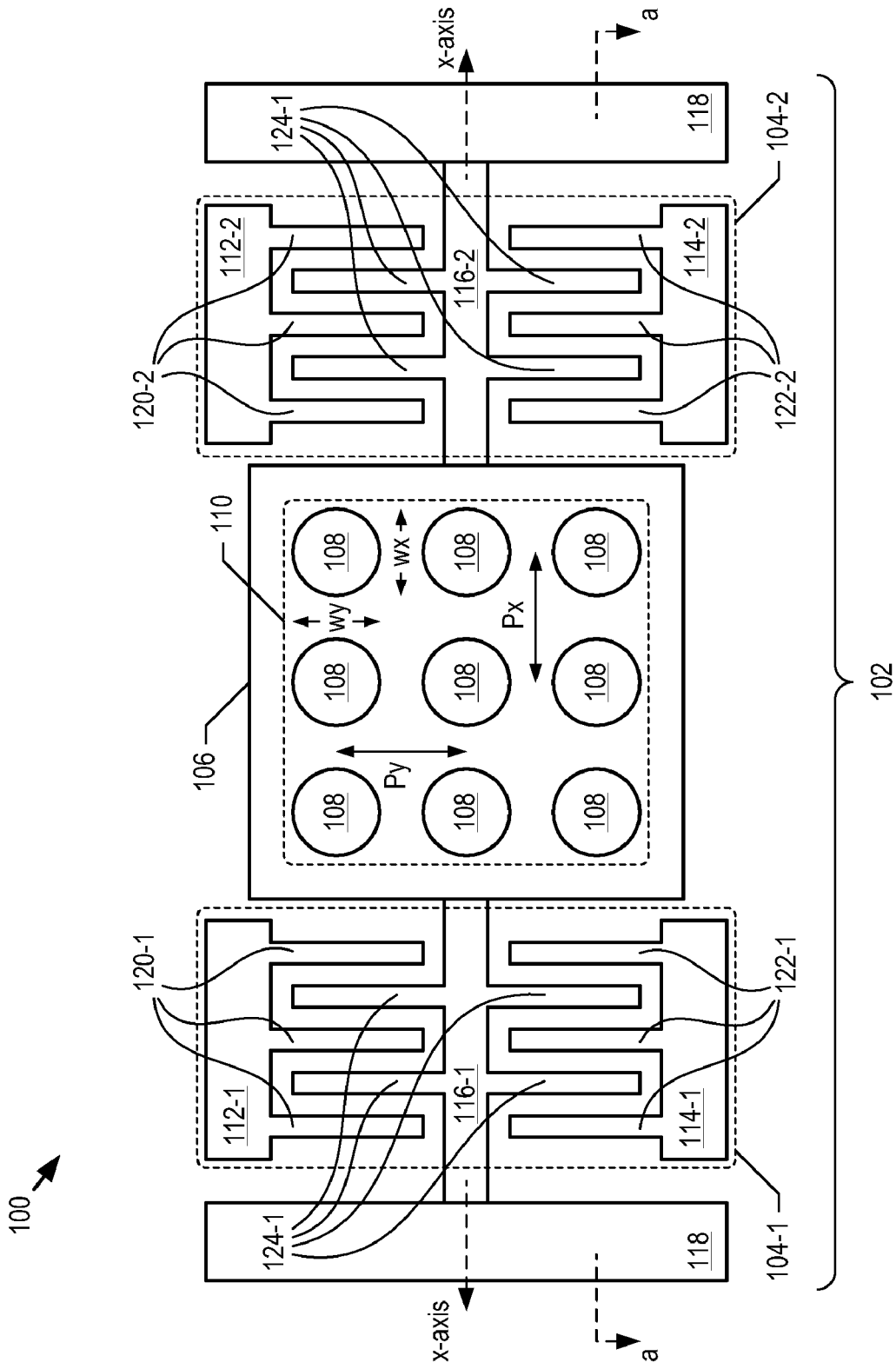
FIG. 1 depicts a top view of a scanning mirror in accordance with an illustrative embodiment.

FIG. 1 depicts a top view of a scanning mirror in accordance with an illustrative embodiment. Scanning mirror 100 comprises mechanical element 102, and photonic crystal 110. Photonic crystal 110 is formed in plate 106. Mechanical element 102 is a torsional scanner that moves plate 106 relative to the underlying substrate (not shown). Specifically, mechanical element 102 rotates plate 106 about the x-axis by means of actuators 104-1 and 104-2 (referred to collectively as actuators 104).

Scanning mirror 100 is operable for light having a wavelength of approximately 1500 nanometers (nm). The optical characteristics of scanning mirror 100 are based upon the design parameters of photonic crystal 110. These design parameters include the refractive index of the material of plate 106, the size of features 108, and the periodicity (i.e., pitch) of features 108. In some embodiments, scanning mirror 100 is operable for electromagnetic waves having a wavelength other than 1500 nm, including any wavelength included in electromagnetic spectrum, and specifically light within the infrared, visible, and ultraviolet light spectra.

Actuators 104 are comb-drive actuators comprising comb finger electrodes 124-1 and 124-2 (referred to collectively as electrodes 124), which are rigidly attached to torsion beams 116-1 and 116-2, respectively. Actuator 124-1 further comprises electrode 112-1 and 114-1, which are positioned on either side of torsion beam 116-1. Electrode 112-1 comprises stationary comb fingers 120-1, which are interposed by half of comb fingers 120-1. In similar fashion, electrode 114-1 comprises stationary comb fingers 122-1, which are interposed by the other half of comb fingers 120-1.

Actuator 124-2 further comprises electrode 112-2 and 114-2, which are positioned on either side of torsion beam 116-2. Electrode 112-2 comprises stationary comb fingers 120-2, which are interposed by half of comb fingers 120-2. In similar fashion, electrode 114-2 comprises stationary comb fingers 122-2, which are interposed by the other half of comb fingers 120-2.

Torsion beams 116-1 and 116-2 are attached to anchors 118, which are fixed to the underlying substrate. Torsion beams 116-1 and 116-2 support plate 106 above the substrate, thereby enabling motion of plate 106 relative to the substrate.

In order to rotate plate 106 in one direction about the x-axis, a voltage is applied between electrodes 112-1 and 112-2 and comb finger electrodes 116-1 and 116-2, respectively. In order to rotate plate 106 in the other direction about the x-axis, a voltage is applied between electrodes 114-1 and 114-2 and comb finger electrodes 116-1 and 116-2, respectively.

Figure 2:
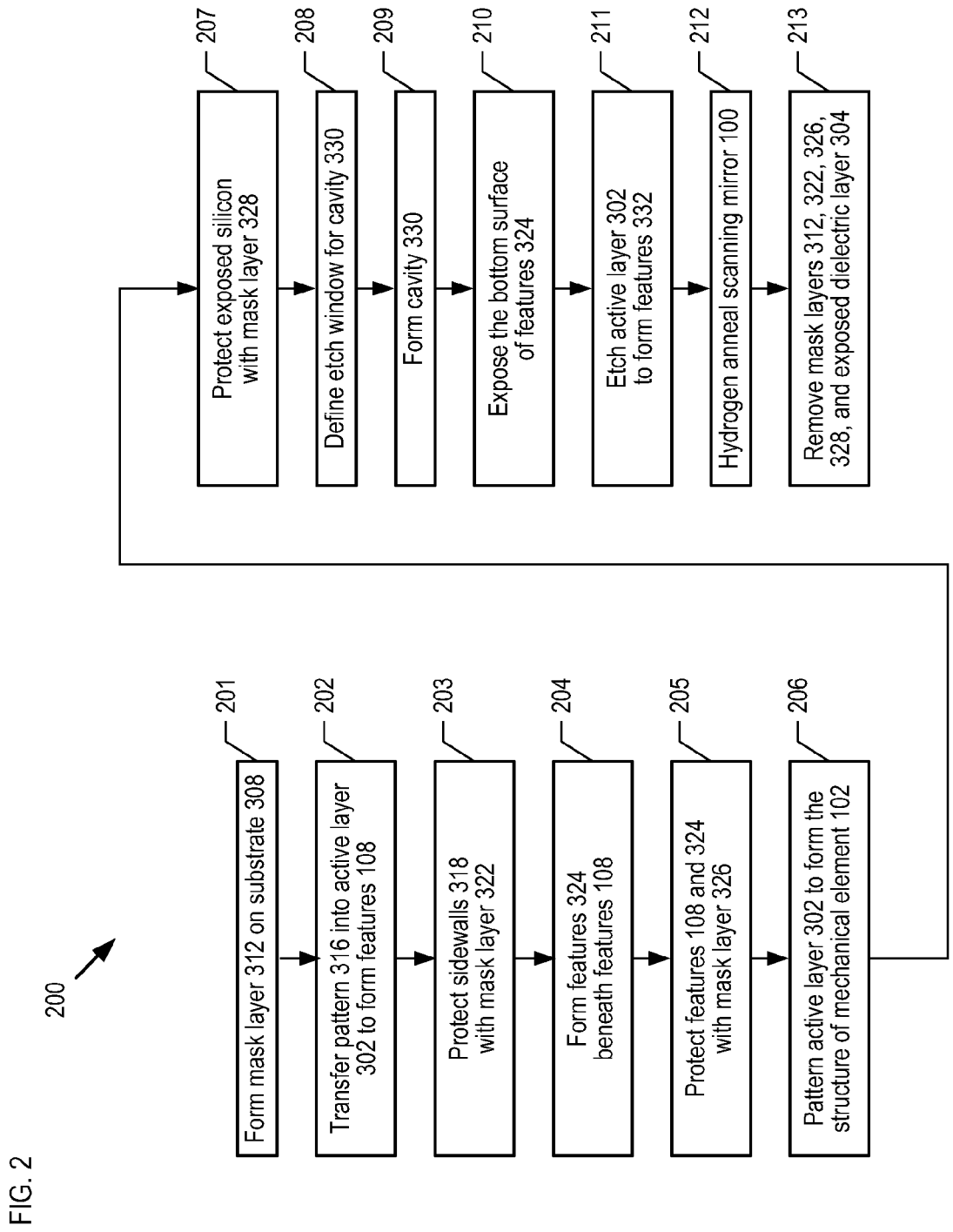
FIG. 2 depicts a method for fabricating a scanning mirror that comprises a photonic crystal in accordance with the illustrative embodiment of the present invention.

FIG. 2 depicts a method for fabricating a scanning mirror that comprises a photonic crystal in accordance with the illustrative embodiment of the present invention. Method 200 is described with reference to FIGS. 3A-3G and with continuing reference to FIG. 1.

FIGS. 3A-3G depict sequential cross-sectional views of scanning mirror 100 during fabrication in accordance with the method depicted in FIG. 2.

Method 200 begins with operation 201, wherein mask layer 312 is formed on surface 310 of active layer 302 off substrate 308.

Substrate 308 is a conventional semiconductor-on-insulator substrate comprising a single-crystal semiconductor layer that is disposed on a buried dielectric layer that is disposed on a bulk semiconductor handle wafer. In some embodiments, substrate 308 is a bulk material substrate, such as a semiconductor wafer, ceramic substrate, and the like.

Active layer 302 is a homogeneous layer of single-crystal silicon having a thickness of approximately 25 microns. In some embodiments, the thickness of active layer 302 is within the range of approximately 1 micron to approximately 100 microns. In some embodiments, active layer 302 is a homogeneous layer of a different material. Suitable materials for use in active layer 302 include, without limitation, silicon-carbide, III-V semiconductors, II-VI semiconductors, ceramics, glasses, oxides, nitrides, oxynitrides, composite materials, polymers, organo-metallics, and the like. It should be noted that the homogeneous nature of the material used in active layer 302 can mitigate or eliminate deleterious effects, such as deformation, warping, or bending of plate 106, due to internal stress and stress gradients.

Mask layer 312 is a layer of material for protecting, in well-known fashion, regions of active layer 302 during subsequent patterning and/or etching operations. Mask layer 312 is a layer of thermally grown silicon dioxide having a thickness of approximately 460 nm. In some embodiments, mask layer 312 is a layer of material other than silicon dioxide. Suitable materials for use in mask layer 312 include, without limitation, silicon monoxide, silicon nitride, metals, polymers, silicon oxynitrides, and the like. In some embodiments, mask layer 312 has a thickness that is within the range of approximately 0.1 micron to approximately 1 micron, and is typically approximately 0.2 mm. It will be clear to one skilled in the art how to make and use mask layer 312.

Mask layer 312 is patterned with openings 314 using conventional photolithography and etching. Openings 314 define pattern 316. As depicted in FIG. 1, in the x-direction, pattern 316 has periodicity Px and width wx. In the y-direction, pattern 316 has periodicity Py and width wy. In the illustrative embodiment, the value of each of Px and Py is approximately 820 nm and the value of each of wx and wy is approximately 790 nm. Pattern 316 dictates the optical characteristics of photonic crystal 110. In some alternative embodiments, pattern 316 comprises:

i. openings 314 that are non-circular; or
ii. different periodicities along different direction; or
iii. a plurality of regions of openings 314, wherein at least one region has a different periodicity than another region; or
iv. a plurality of regions of openings 314, wherein at least one region has openings having a different width than openings in another region; or
v. a region having a periodicity that is unaligned with either the x-direction or the y-direction; or
vi. any combination of i, ii, iii, iv, and v.

Typically, openings 314 have a width within the range of approximately 200 nm to approximately 2000 nm and the periodicity of pattern 316, in at least one dimension, is within the range of approximately 300 nm to approximately 2000 nm. It will be clear to one skilled in the art, however, that each of the width of openings 314 and the periodicity of pattern 316 can be any value suitable for the application for which photonic crystal 110 is intended.

At operation 202, pattern 316 is transferred into active layer 302, using a directional etch, to form features 108.

Features 108 are circular regions having a substantially uniform width of approximately 820 microns and a depth, d1, of approximately 1 micron. In some alternative embodiments, the depth of features 108 is within the range of approximately 0.2 micron to approximately 15 microns. The use of a directional etch results in features 108 that have substantially the same cross-sectional shape as openings 314. After their formation, features 108 have substantially vertical sidewalls 318 and bottom surface 320. Suitable directional etches include, without limitation, deep reactive ion etching (DRIE), ion milling, sand blasting, anisotropic wet etching, and the like. It will be clear to one skilled in the art, after reading this specification, how to transfer pattern 316 into active layer 302.

FIG. 3A depicts a cross-section of scanning mirror 100, through line a-a, after operation 202.

At operation 203, mask layer 322 is formed. Mask layer 322 is a layer of thermally-grown silicon dioxide having a thickness within the range of approximately 100 nm to approximately 1 micron, and typically 150 nm. Mask layer 322 forms on mask layer 312, sidewalls 318, and bottom surface 320. In order to enable the subsequent formation of features 324, mask layer 322 is removed from bottom surface 320 using a directional etch. This etch leaves mask layer 322 on sidewalls 318, however.

FIG. 3B depicts a cross-section of scanning mirror 100, through line a-a, after operation 203.

At operation 204, features 324 are formed by etching active layer 302 through features 108. Mask layer 312, features 108, and layer 322 collectively define a mask for forming features 324 in operation 204. Features 324 are formed by etching active layer 302 in a conventional directional silicon etch. In some embodiments, features 324 are formed using a non-directional etch, such as a conventional reactive ion etch using sulfur hexafluoride as the etch primary etch gas. In embodiments wherein a non-directional etch is used to form features 324, the width of features 324 is greater than width wx1. It will be clear to one skilled in the art, after reading this specification, how to form features 324.

At operation 205, mask layer 326 is formed. Mask layer 326 is a layer of thermally-grown silicon dioxide having a thickness within the range of approximately 100 nm to approximately 1 micron, and typically 150 nm. Mask layer 326 forms on mask layer 322, sidewalls 318, and the bottom surface of features 324. Mask layer 326 protects partially formed photonic crystal 110 during the subsequent formation of mechanical element 102.

Figure 3C:
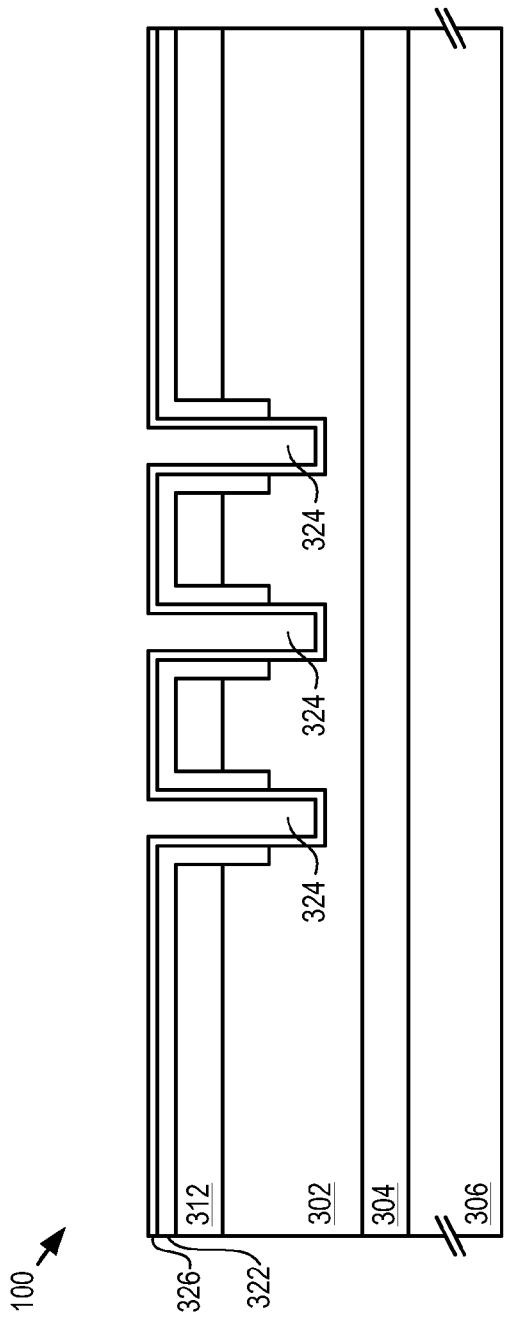

FIG. 3C depicts a cross-section of scanning mirror 100, through line a-a, after operation 205.

At operation 206, mechanical element 102 is formed. In operation 206, suitable conventional photolithography and direction etching is used to pattern active layer 304, thereby defining the structural material of plate 106, actuators 104-1 and 104-2, torsion beams 116-1 and 116-2, and anchors 118. It will be clear to one skilled in the art, after reading this specification, how to make and use alternative embodiments of the present invention wherein mechanical element 102 is a mechanical element other than a torsional scanner.

Figure 3D:
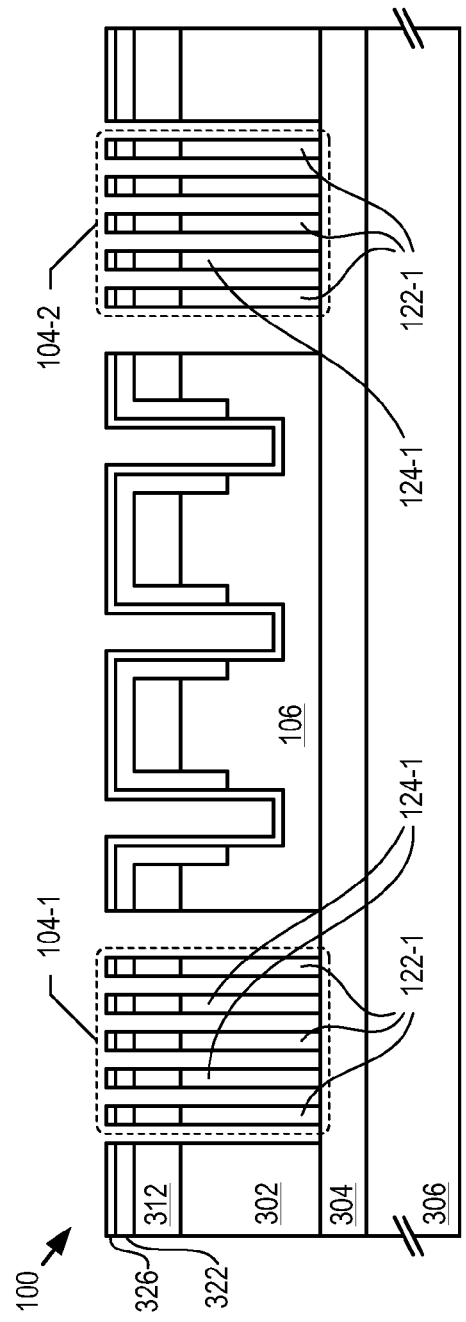

FIG. 3D depicts a cross-section of scanning mirror 100, through line a-a, after operation 206.

At operation 207, mask layer 328 is formed on all exposed surfaces of scanning mirror 100, including the back surface of bulk layer 306.

At operation 208, mask layer 328 is patterned to open a region on the back surface of bulk layer 306.

At operation 209, bulk layer 306 is etched in conventional fashion to form cavity 330, which exposes buried dielectric layer 304.

At operation 210, mask layer 328 is removed from the bottom surface of features 324.

Figure 3E:
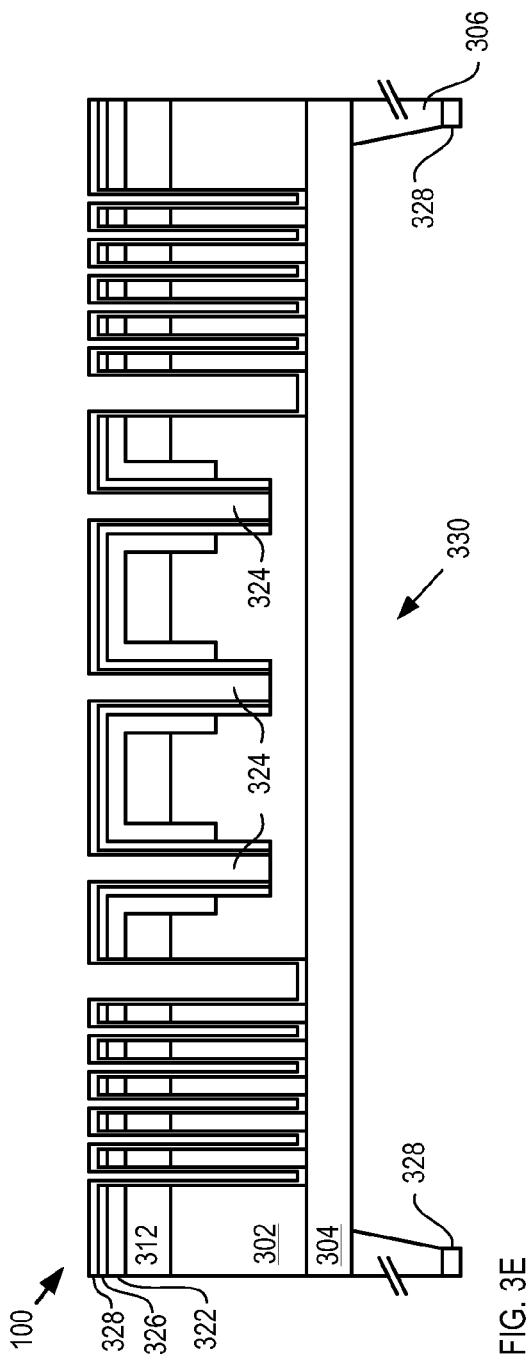

FIG. 3E depicts a cross-section of scanning mirror 100, through line a-a, after operation 210.

At operation 211, active layer 302 is etched in a non-directional etch. Active layer 302 is etched through features 108 and 324 to form features 332. Features 108 are protected by the mask layer that still remains on sidewalls 318.

At operation 212, scanning mirror 100 is treated in a hydrogen anneal. During the hydrogen anneal, hydrogen absorbs on all exposed silicon surfaces. As a result, silicon atoms are dissociated from the exposed surfaces at a temperature much lower than the normal melting point of silicon. The dissociated silicon atoms reflow to reduce surface energy. By virtue of the hydrogen anneal, the surface roughness of exposed silicon surfaces is reduced. The smoothing of these surfaces, in turn, reduces optical scattering and other undesired optical effects and improves the optical performance of photonic crystal 110.

Figure 3F:
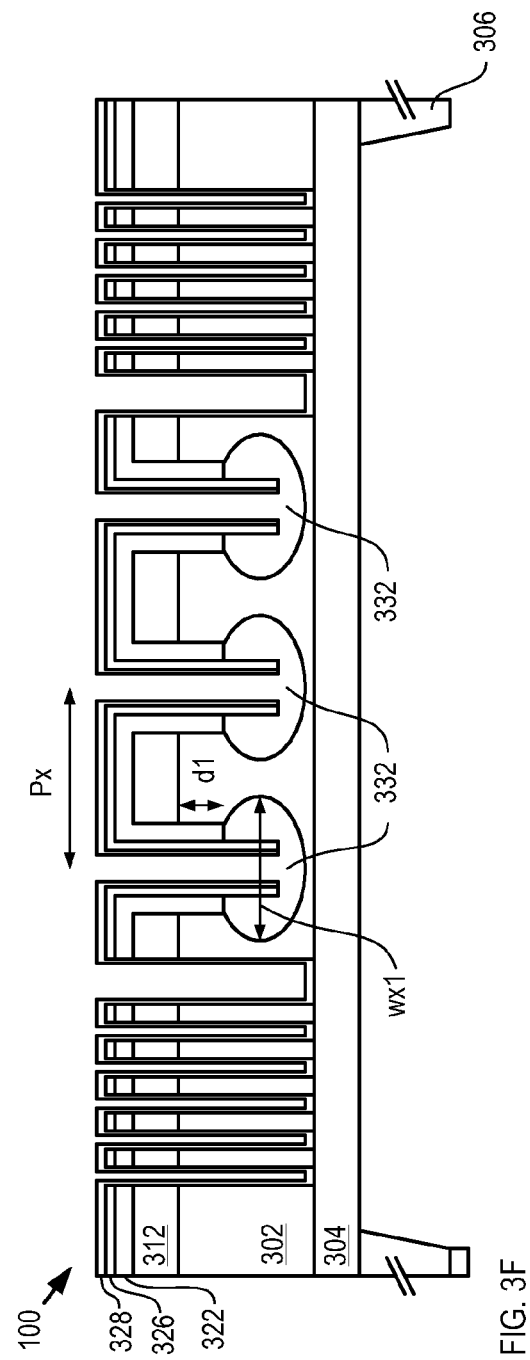

FIG. 3F depicts a cross-section of scanning mirror 100, through line a-a, after operation 212.

At operation 213, mask layers 312, 326, 328, and exposed regions of buried dielectric layer 304 are removed in a vapor hydrofluoric acid etch. As a result, scanning mirror 100 comprises only the material of active layer 302. As discussed above, the use of a homogeneous material for active layer 302 affords several advantages for scanning mirror 100. For example, a photonic crystal comprising a single material typically exhibits lower internal stress, little or no stress gradient, and little or no temperature sensitivity due to thermal expansion mismatches. Furthermore, a photonic crystal comprising a homogeneous material structure is less likely to encounter etch-selectivity problems when subjected to subsequent fabrication steps. As a result, such a photonic crystal is more easily integrated with other components, such as micromechanical devices, nanomechanical devices, photonic devices, microfluidics components, and the like. In some embodiments, however, mask layer 312 and layer 322 are not removed but, instead, form part of the structure of photonic crystal 110 and impact its optical characteristics.

Figure 3G:
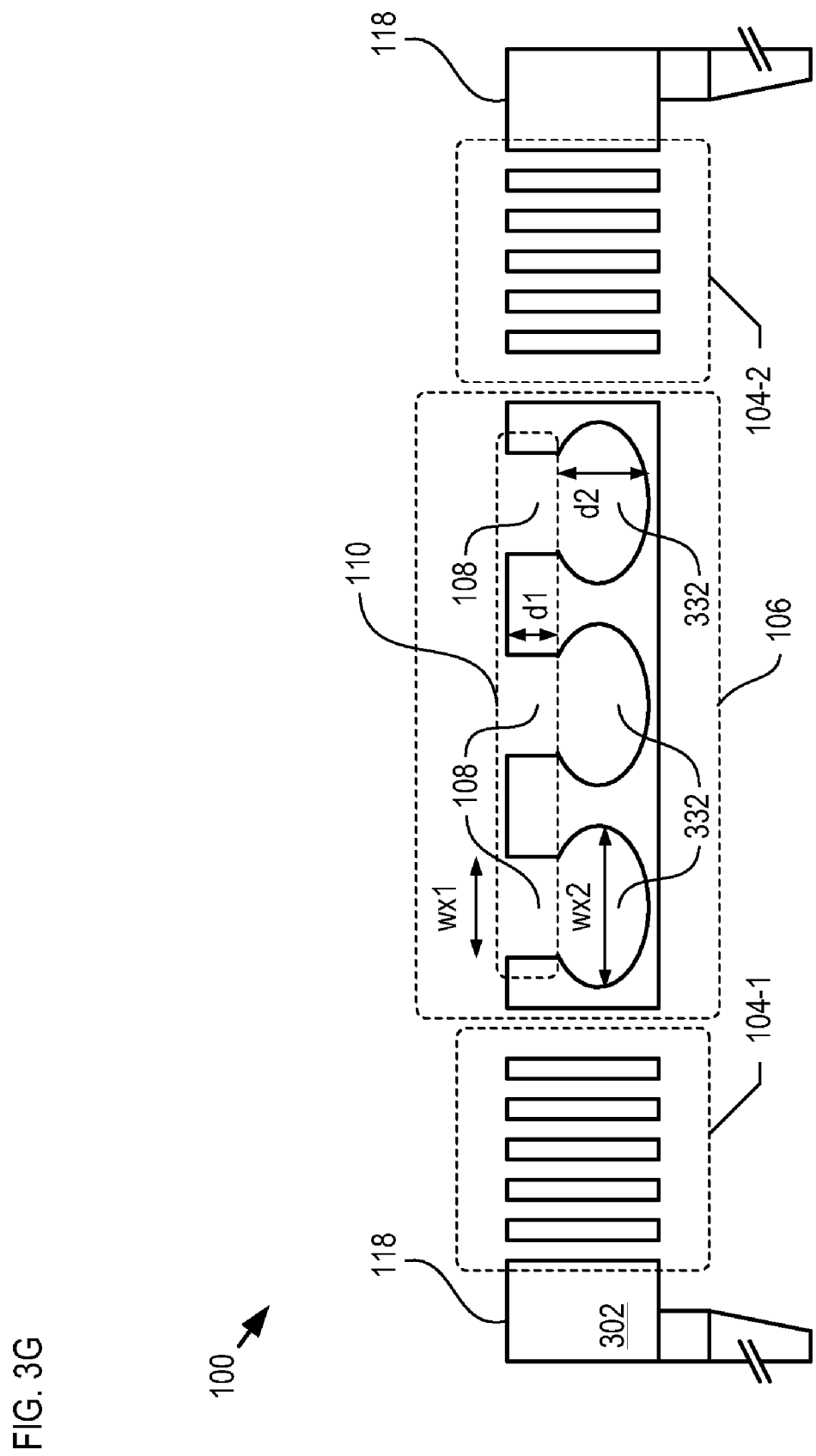

FIG. 3G depicts a cross-section of scanning mirror 100, through line a-a, after operation 213.

Figure 4A:
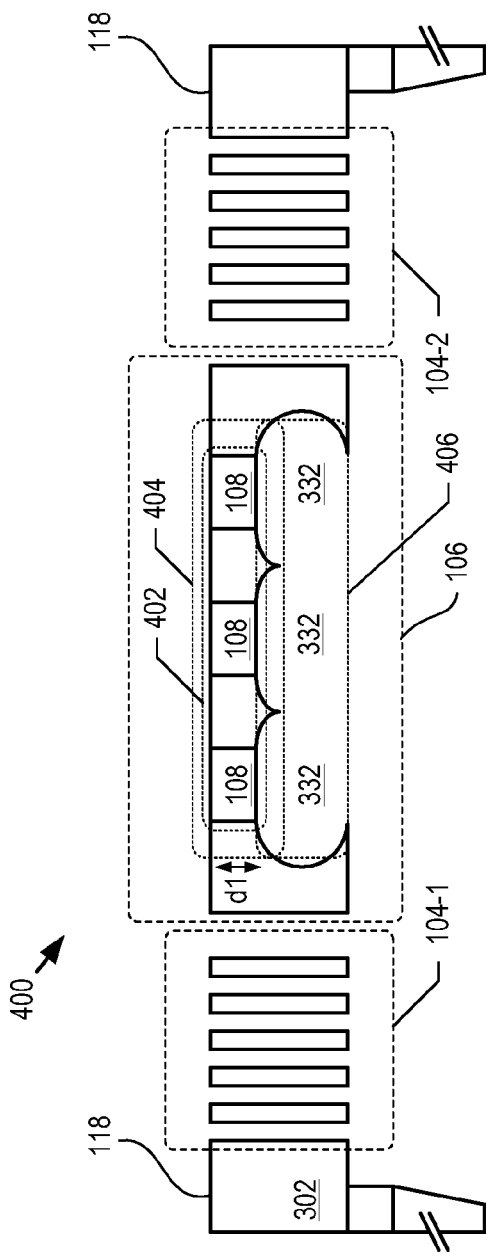
FIG. 4A depicts a cross-sectional view of details of a scanning mirror in accordance with an alternative embodiment of the present invention.

FIG. 4A depicts a cross-sectional view of details of a scanning mirror in accordance with an alternative embodiment of the present invention. Scanning mirror 400 comprises mechanical element 102, and photonic crystal 402. Photonic crystal 402 is formed in plate 106.

Photonic crystal 402 is analogous to photonic crystal 110 and scanning mirror 400 is formed using the operations of method 200. In contrast to the illustrative embodiment, however, operation 211 continues until the width of features 324 is greater than one half the period of photonic crystal 110 (i.e., wx2>Px/2 along the x direction and wy2>Py/2 along the y direction [not shown]). This enables features 324 to merge together to form gap 406. The formation of gap 406 completely undercuts membrane 404, which comprises photonic crystal 402. The removal of active layer material completely from the region beneath photonic crystal 402 enables optical characteristics of photonic crystal 402 to be substantially free of influence by the substrate.

In some embodiments, gap 406 is less than the remainder of the thickness of active layer 302; therefore, a sheet of active layer material remains below membrane 404. In such embodiments, a micromechanical actuator (e.g., an electrostatic actuator, an electromagnetic actuator, a thermal actuator, a microfluidics actuator, etc.) can be added to change the thickness of gap 406. Using such an actuator, gap 406 can be controlled to, for example, change the optical characteristics of photonic crystal 402 by variably introducing substrate effects or form an etalon.

Figure 4B:
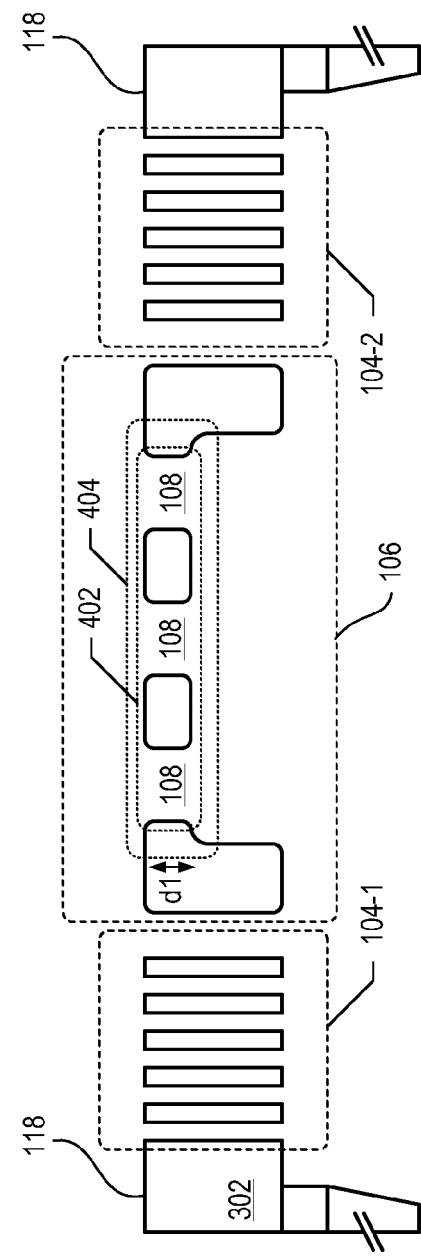
FIG. 4B depicts scanning mirror 400 after it has gone through a hydrogen anneal.

FIG. 4B depicts scanning mirror 400 after it has gone through a hydrogen anneal. By virtue of the reflow of the silicon atoms, the sharp edges and projections associated with the formation of photonic crystal 402 are smoothed and the overall surface roughness of all of the exposed silicon surfaces is reduced.

Figure 5A:
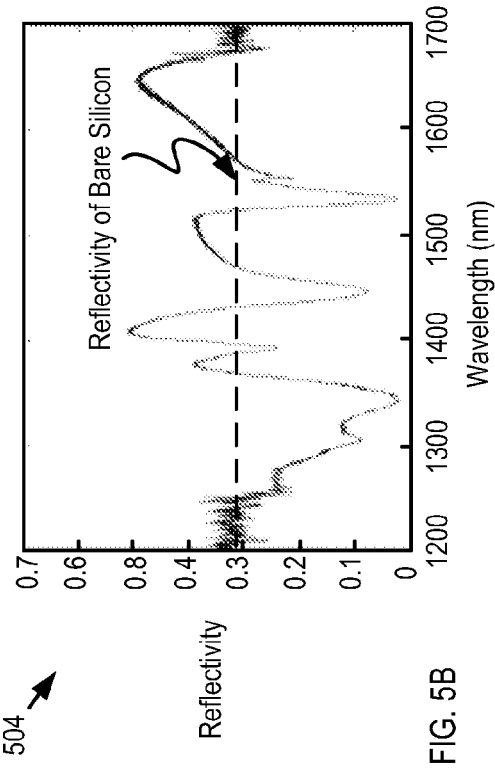
FIG. 5A depicts a cross-section of a partially undercut photonic crystal.

FIG. 5A depicts a cross-section of a partially undercut photonic crystal. Photonic crystal 500 is analogous to photonic crystal 110. Photonic crystal 500 comprises a 100×100 micron two-dimensional pattern of features 502, which are 620 nm circular features. Features 502 are arrayed in a square lattice having a 1 micron periodicity in both the x and y dimensions.

Figure 5B:
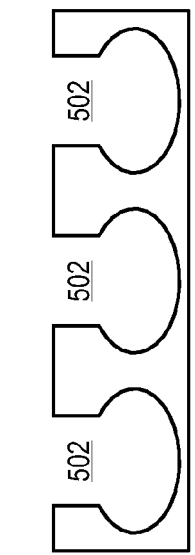
FIG. 5B depicts a reflection spectrum for photonic crystal 500.

FIG. 5B depicts a reflection spectrum for photonic crystal 500. The influence of the photonic crystal structure on reflectivity spectrum 504 is evinced by the deviation of the spectrum from the reflectivity spectrum for bare silicon (approximately 31% across the wavelength range shown). In addition, the partially undercut structure of photonic crystal 500 results in the spectrum having regions that rapidly change from high reflectivity to very low reflectivity (i.e., high transmissivity) over only a few tens of nm. For example, the reflectivity of the photonics crystal is nearly 0% for light having a wavelength of approximately 1535 nm, yet is approximately 30-40% for light having a wavelength of 1520 or 1560 nm. As such, photonic crystal 500 could be used as an effective wavelength filter in some applications.

It should be noted that the amount of lateral undercut in photonic crystal 500 will affect the spectral characteristics of the device and, therefore, its suitability in some applications.

Figure 6A:
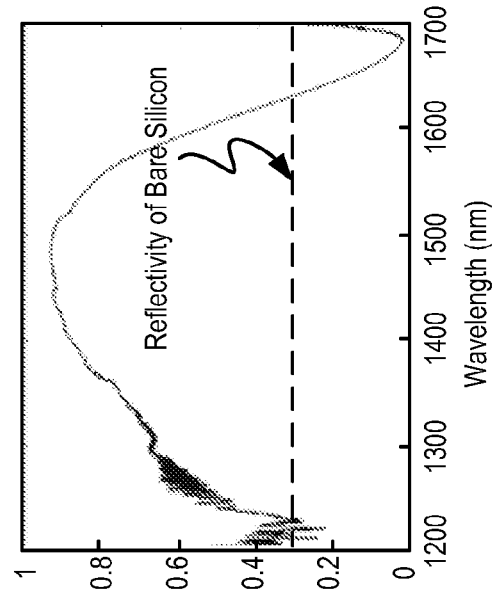
FIG. 6A depicts a cross-section of a fully undercut photonic crystal.

FIG. 6A depicts a cross-section of a fully undercut photonic crystal. Photonic crystal 600 is analogous to photonic crystal 402. Photonic crystal 600 comprises a 100×100 micron two-dimensional pattern of features 602, which are 790 nm circular features. By virtue of the complete undercut beneath features 602, membrane 604 is formed. Membrane 604 is separated from underlying layer 608 by gap 606. In some embodiments, membrane 604 and underlying layer 608 collectively define an etalon. Features 602 are arrayed in a square lattice having a periodicity of 820 nm in both the x and y dimensions.

Figure 6B:
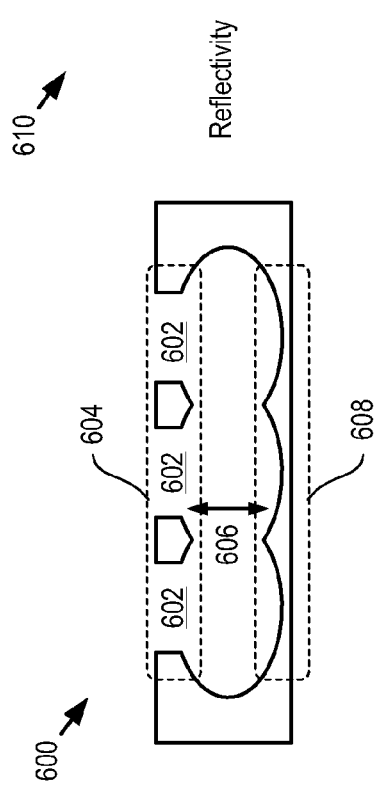
FIG. 6B depicts a reflection spectrum for a fully undercut photonic crystal.

FIG. 6B depicts a reflection spectrum for a fully undercut photonic crystal. Reflectivity spectrum 610 demonstrates a broadband reflectivity for photonic crystal 600 that is higher than that of bare silicon. Photonic crystal 600, therefore, is suitable for use an effective mirror in many applications.

As mentioned briefly above, an actuator for controlling the separation between membrane 604 and an underlying layer (i.e., layer 608) can be formed. Such an actuator would enable the control of gap 606 and, therefore, the degree to which the underlying layer affects the spectral characteristics of photonic crystal 600. Such a device, therefore, may be suitable for: (1) optical switching applications, wherein it is desired to alternate between a degree of reflectivity and a degree of transmissivity; or (2) tunable wavelength filter applications, wherein the wavelength at which the photonic crystal is transmissive (or reflective) is controllable.

FIG. 7 depicts a method for fabricating a photonic crystal in accordance with an alternative embodiment of the present invention. Method 700 comprises operations for forming features 804 below features 108. In some embodiments, method 700 can be used instead of operation 204 in method 200. The formation of features 804 is described below and with respect to FIGS. 8A and 8B, with continuing reference to FIG. 1.

FIGS. 8A-B depict sequential cross-sections of photonic crystal 800 during fabrication in accordance with the alternative embodiment of the present invention.

Method 700 begins with operation 701, wherein features 802 are formed by etching active layer 302 through features 108. As in operation 204, features 108, and mask layer 322 together define a mask for forming features 802 in operation 701. Features 802 are formed by etching active layer 302 in a substantially directional etch.

At operation 702, active layer 302 undergoes a hydrogen anneal. During this operation, dissociation and reflow of silicon atoms in the exposed sidewalls 804 and bottom 806 of feature 802 enables the silicon atoms to substantially minimize surface energy. As a result, exposed silicon surfaces become smoother and form substantially spherically shaped features 808.

Figure 9:
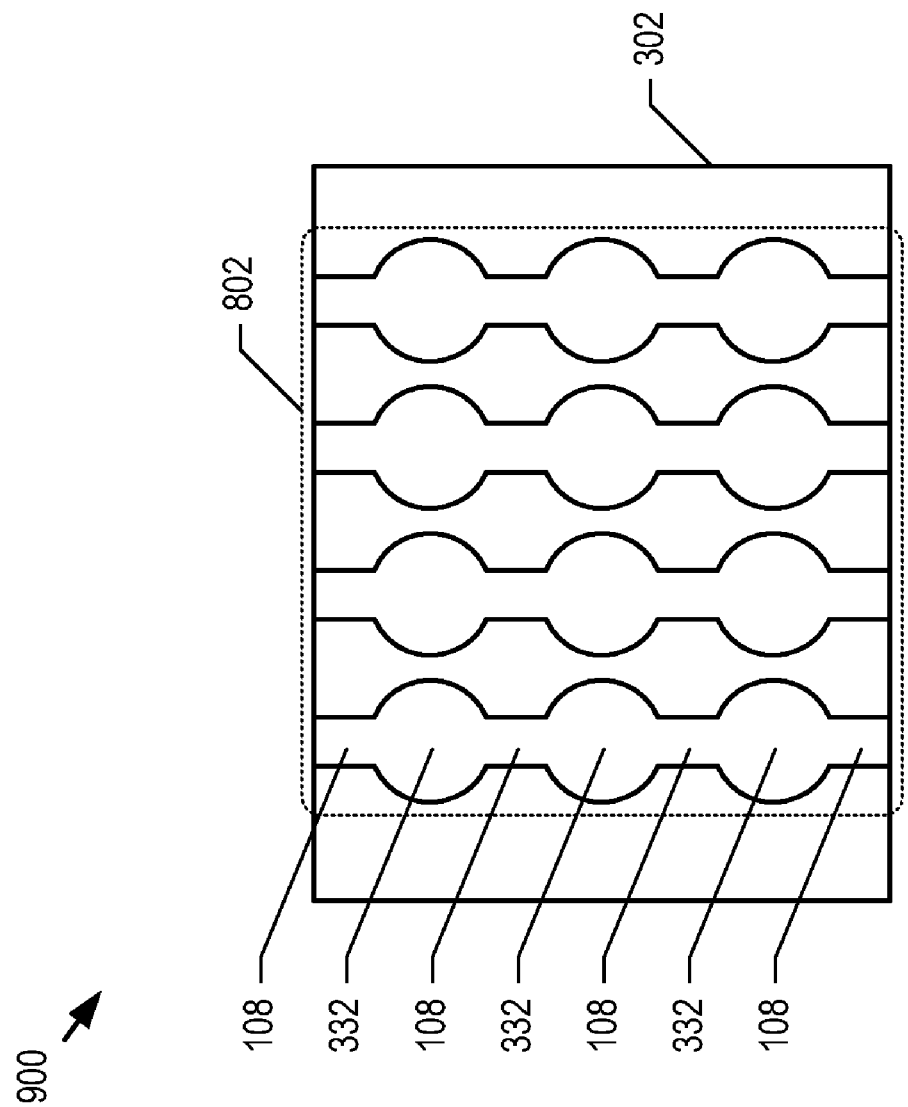
FIG. 9 depicts a three-dimensional photonic crystal in accordance with an alternative embodiment of the present invention.

FIG. 9 depicts a three-dimensional photonic crystal in accordance with an alternative embodiment of the present invention. Photonic crystal 900 comprises a vertical repetitive pattern of features 108 and 332. This pattern is duplicated in both x and y dimensions, thereby defining a three-dimensional photonic crystal. In some embodiments, at least some of features 108 are replaced by features 332.

Photonic crystal 900 is formed by operations of method 200, wherein any combination of some or all of its operations is repeated as many times as necessary to form the desired number of features in the vertical dimension.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   forming a photonic crystal on a substrate, wherein the photonic crystal is formed in a first layer of a first material, and wherein the first layer is homogeneous, and further wherein the photonic crystal is formed by operations comprising;
      forming a first plurality of features in a first surface of the first layer, wherein the first plurality of features has a first periodicity, and wherein each of the first plurality of features has a first width; and
      forming a second plurality of features in the first layer, wherein the first plurality of features and second plurality of features have a one-to-one correspondence, and wherein each of the second plurality of features has a second width that is equal to or greater than the one half of the first periodicity;
   wherein the first plurality of features interposes the first surface and the second plurality of features.

2. The method of claim 1 wherein the second plurality of features is formed by operations comprising:
   forming a first mask layer on the sidewalls of each of the first plurality of features, wherein the first mask layer is resistant to a first etch; and
   etching the first layer through the first plurality of features, wherein the first layer is etched with the first etch.

3. The method of claim 1 wherein the second plurality of features is formed by operations comprising:
   selecting a first mask layer material for a first mask layer, wherein the first mask layer material is resistant to a first etch and a second etch, and wherein the first etch is a substantially directional etch, and further wherein the second etch that is a substantially non-directional etch;
   forming the first mask layer on the sidewalls of each of the first plurality of features;

etching the first layer through the first plurality of features, wherein the first layer is etched with the first etch; and
etching the first layer through the first plurality of features, wherein the first layer is etched with the second etch.

4. The method of claim 1 further comprising:
selecting the first periodicity; and
selecting the first width;
wherein the first material is characterized by a refractive index, and wherein the refractive index, the first periodicity, and the first width collectively define a first photonic bandgap.

5. The method of claim 4 further comprising selecting the first photonic bandgap, wherein the first photonic bandgap enables a reflectivity of the photonic crystal for light having a first wavelength.

6. The method of claim 1 wherein the first plurality of features is formed having the first periodicity in a first direction and a second periodicity in a second direction, and wherein each of the first plurality of features has the first width in the first direction and a third width in the second direction;
wherein the first material is characterized by a refractive index, and wherein the refractive index, the first periodicity, and the first width collectively define a first photonic bandgap along the first direction; and
wherein the refractive index, the second periodicity, and the third width collectively define a second photonic bandgap along the second direction.

7. The method of claim 1 further comprising forming a mechanical element, wherein the mechanical element is movable with respect to the substrate, and wherein the mechanical element comprises the photonic crystal.

8. The method of claim 7 wherein the mechanical element is formed by operations comprising:
forming a first mask layer on the photonic crystal, wherein the first mask layer comprises a mask material that is resistant to a first etch; and
etching the first layer in the first etch.

9. The method of claim 1 further comprising annealing the photonic crystal in an atmosphere comprising hydrogen.

10. A method comprising:
(1) forming a photonic crystal in a first layer of a first material, wherein the first material is homogeneous, and wherein the photonic crystal is formed by operations comprising;
(a) forming a first plurality of features in a first surface of the first layer, wherein the first plurality of features has a first periodicity, and wherein each of the first plurality of features has first sidewalls and a first bottom surface, and further wherein each of the first plurality of features has a first width;
(b) forming a first mask layer on the first sidewalls of each of the first plurality of features, wherein the first mask layer comprises a first mask material that is resistant to a first etch; and
(c) etching the first layer in the first etch to form a second plurality of features having second sidewalls and a second bottom surface, wherein the first layer is etched by the first etch through the first bottom surface of each of the first plurality of features, and wherein each of the second plurality of features has a second width that is greater than the first width; and
(2) forming a mechanical element, wherein the mechanical element is movable with respect to the substrate, and wherein the mechanical element and the photonic crystal are operatively coupled, and further wherein the mechanical element is formed by operations comprising:
(a) forming a second mask layer on the photonic crystal, wherein the second mask layer comprises a second mask material that is resistant to a second etch; and
(b) etching the first layer in the second etch.

11. The method of claim 10 further comprising:
forming a second mask layer on the second sidewalls of each of the second plurality of features, wherein the second mask layer comprises a second mask material that is resistant to a second etch;
etching the first layer in the second etch to form a third plurality of features having third sidewalls and a third bottom surface, wherein the first layer is etched by the second etch through the second bottom surface of each of the second plurality of features, and wherein each of the third plurality of features has a third width that is substantially equal to the first width;
forming a third mask layer on the third sidewalls of each of the third plurality of features, wherein the third mask layer comprises a third mask material that is resistant to a third etch; and
etching the first layer in the third etch to form a fourth plurality of features, wherein the first layer is etched by the third etch through the third bottom surface of each of the third plurality of features, and wherein each of the fourth plurality of features has a fourth width that is larger than the third width.

12. The method of claim 10 further comprising providing a substrate comprising the first layer, wherein the first layer is disposed on a dielectric layer that is disposed on a bulk layer.

13. The method of claim 10 further comprising:
selecting a first set of guided resonances;
selecting the first material, wherein the first material is characterized by a refractive index;
selecting the first width; and
selecting the first periodicity;
wherein the first set of guided resonances is based on the index of refraction, the first width, and the first periodicity.

14. The method of claim 10 wherein the first plurality of features is formed having the first periodicity in a first direction and a second periodicity in a second direction, and wherein each of the first plurality of features has the first width in the first direction and a third width in the second direction;
wherein the first material is characterized by a refractive index, and wherein the photonic crystal has a first set of guided resonances that is based on the refractive index, the first periodicity, and the first width; and
wherein the photonic crystal has a second set of guided resonances that is based on the refractive index, the second periodicity, and the third width.

15. The method of claim 10 wherein the mechanical element comprises the photonic crystal.

16. An apparatus comprising:
a photonic crystal comprising;
a first layer having a first surface, wherein the first layer is homogeneous, and wherein the first layer is characterized by a refractive index; and
a first plurality of features, wherein the first plurality of features extend from the first surface into the first layer, and wherein the first plurality of features defines a pattern that has a first periodicity, and wherein each of the first plurality of features comprises:

a first element having a first width that is substantially aligned with the first periodicity; and a second element having a second width, wherein the second width is substantially aligned with the first width, and wherein the second width is equal to or greater than half the period of the first periodicity;

wherein the first element interposes the first surface and the second element;

wherein the photonic crystal comprises a first set of guided resonances that is based on the refractive index, the first periodicity, and the first width.

17. The apparatus of claim 16 wherein the first layer comprises single-crystal silicon.

18. The apparatus of claim 16 wherein the pattern further comprises a second periodicity, and wherein the first periodicity is aligned to a first direction and the second periodicity is aligned to a second direction, and wherein the first plurality of features is characterized by a third width that is substantially aligned with the second direction, and further wherein the photonic crystal comprises a second set of guided resonances that is based on the refractive index, the second periodicity, and the third width.

19. The apparatus of claim 18 wherein the third width is greater than or equal to the period of the second periodicity.

20. The apparatus of claim 16 further comprising a mechanical component, wherein the mechanical component and the photonic crystal are operatively coupled.

21. The apparatus of claim 20 wherein the mechanical component comprises the photonic crystal.

22. The apparatus of claim 16 wherein each of the first plurality of features further comprises:
a third element having a third width, wherein the third width is substantially aligned with the first width, and wherein the third width and the first width are substantially equal; and
a fourth element having a fourth width, wherein the fourth width is substantially aligned with the first width, and wherein the fourth width and the second width are substantially equal;
wherein the first element has a first depth, the second element has a second depth, the third element has a third depth, and the fourth element has a fourth depth;
wherein the first depth and third depth are substantially equal;
wherein the second depth and the fourth depth are substantially equal; and
wherein each of the first plurality of features has a second periodicity that is based on the first depth, second depth, third depth, and fourth depth;
wherein the photonic crystal has a second set of guided resonances that is based on the refractive index, the second periodicity, the first width, and the second width.

23. The apparatus of claim 16 wherein the apparatus further comprises a substrate comprising the first layer, wherein the first layer is disposed on a dielectric layer that is disposed on a bulk layer.

24. The apparatus of claim 23 further comprising a mechanical component, wherein the mechanical component is formed in the first layer, and wherein the mechanical component comprises the photonic crystal.

25. A method comprising:
(1) forming a photonic crystal on a substrate, wherein the photonic crystal is formed in a first layer of a first material, and wherein the first layer is homogeneous, and further wherein the photonic crystal is formed by operations comprising;
(a) forming a first plurality of features in a first surface of the first layer, wherein the first plurality of features has a first periodicity, and wherein each of the first plurality of features has a first width; and
(b) forming a second plurality of features in the first layer, wherein the first plurality of features and second plurality of features have a one-to-one correspondence, and wherein each of the second plurality of features has a second width that is larger than the first width, and further wherein the first plurality of features interposes the first surface and the second plurality of features; and
(2) forming a mechanical element, wherein the mechanical element is movable with respect to the substrate, and wherein the mechanical element comprises the photonic crystal, and wherein the mechanical element is formed by operations comprising;
(a) forming a first mask layer on the photonic crystal, wherein the first mask layer comprises a mask material that is resistant to a first etch; and
(b) etching the first layer in the first etch.

26. The method of claim 25 wherein the second plurality of features is formed by operations comprising:
forming a first mask layer on the sidewalls of each of the first plurality of features, wherein the first mask layer is resistant to a first etch; and
etching the first layer through the first plurality of features, wherein the first layer is etched with the first etch.

27. The method of claim 25 wherein the second plurality of features is formed by operations comprising:
selecting a first mask layer material for a first mask layer, wherein the first mask layer material is resistant to a first etch and a second etch, and wherein the first etch is a substantially directional etch, and further wherein the second etch that is a substantially non-directional etch;
forming the first mask layer on the sidewalls of each of the first plurality of features;
etching the first layer through the first plurality of features, wherein the first layer is etched with the first etch; and
etching the first layer through the first plurality of features, wherein the first layer is etched with the second etch.

28. The method of claim 25 wherein the first plurality of features is formed having the first periodicity in a first direction and a second periodicity in a second direction, and wherein each of the first plurality of features has the first width in the first direction and a third width in the second direction;
wherein the first material is characterized by a refractive index, and wherein the refractive index, the first periodicity, and the first width collectively define a first photonic bandgap along the first direction; and
wherein the refractive index, the second periodicity, and the third width collectively define a second photonic bandgap along the second direction.

29. The method of claim 25 further comprising annealing the photonic crystal in an atmosphere comprising hydrogen.

30. The method of claim 25 further comprising:
selecting the first periodicity; and
selecting the first width;
wherein the first material is characterized by a refractive index, and wherein the refractive index, the first periodicity, and the first width collectively define a first photonic bandgap.

31. The method of claim 30 further comprising selecting the first photonic bandgap, wherein the first photonic bandgap enables a reflectivity of the photonic crystal for light having a first wavelength.

* * * * *